(12) United States Patent
Lu (10) Patent No.: US 6,464,905 B1
(45) Date of Patent: Oct. 15, 2002

(54) METHOD OF PERFORMING A UNIFORM ILLUMINATION PATTERN IN A BACK-LIGHT PLATE USING SAND-BLASTING

(75) Inventor: Jih-Yung Lu, San-Chung (TW)

(73) Assignee: Benq Corporation, Taoyuan (TW)

( * ) Notice: Subject to any disclaimer, the term of this patent is extended or adjusted under 35 U.S.C. 154(b) by 63 days.

(21) Appl. No.: 09/639,829

(22) Filed: Aug. 17, 2000

(30) Foreign Application Priority Data

May 22, 2000 (TW) ........................................ 89109869 A (51) Int. Cl.⁷ .............................................. B29D 11/00
(52) U.S. Cl. .......................... 264/2.7; 216/24; 264/154
(58) Field of Search ........................ 264/1.1, 2.7, 1.37, 264/400, 482, 154, 156; 216/22, 24

(56) References Cited

U.S. PATENT DOCUMENTS 3,887,887 A * 6/1975 Wagers et al.

5,833,517 A * 11/1998 Konda et al.

FOREIGN PATENT DOCUMENTS

JP         7-114879       * 5/1995

* cited by examiner

Primary Examiner—Mathieu D. Vargot
(74) Attorney, Agent, or Firm—Winston Hsu (57) ABSTRACT

A method of performing a uniform illumination pattern in a back-light plate using sand-blasting process. This method mainly includes two steps. The first step is to perform a manufacturing process, for example a chemical etching process or a laser-cutting process, to form a hole mask on a metal plate with a predetermined hole pattern. The second step is to position the hole mask of the metal plate on one illuminating face of the back-light plate to perform a sand-blasting process. A plurality of recesses, each being no deeper than a predetermined depth, are consequently formed to serve as a uniform illumination pattern of the back-light plate. When visible light emits into the back-light plate, the plurality of recesses on the illuminating face make the emitted visible light uniformly illuminated.

10 Claims, 7 Drawing Sheets

METHOD OF PERFORMING A UNIFORM ILLUMINATION PATTERN IN A BACK-LIGHT PLATE USING SAND-BLASTING

BACKGROUND OF THE INVENTION

1. Field of the Invention

The present invention relates to a method of performing a uniform illumination pattern in a back-light plate. More specifically, the present invention relates to a method of performing a uniform illumination pattern in a back-light plate using sand-blasting.

2. Description of the Prior Art

The inner light source of a scanner or a liquid crystal display (LCD)comprises a fluorescent tube and a back-light plate to generate a back-light source, in order to scan a transparent document or to illuminate an LCD panel. Because the fluorescent tube is placed on one incident side of the back-light plate, the light emitted from the back-light plate is not uniformly distributed over the entire back-light plate, especially brighter in the area near the incident side of the back-light plate. In order to solve the problem of non-uniform illumination, the prior art teaches to make plural spots on the back-light plate. The purpose of these spots is to reflect the light from the incident side of the back-light plate, so the light emitted from the illuminating face can be uniform.

Figure 1:
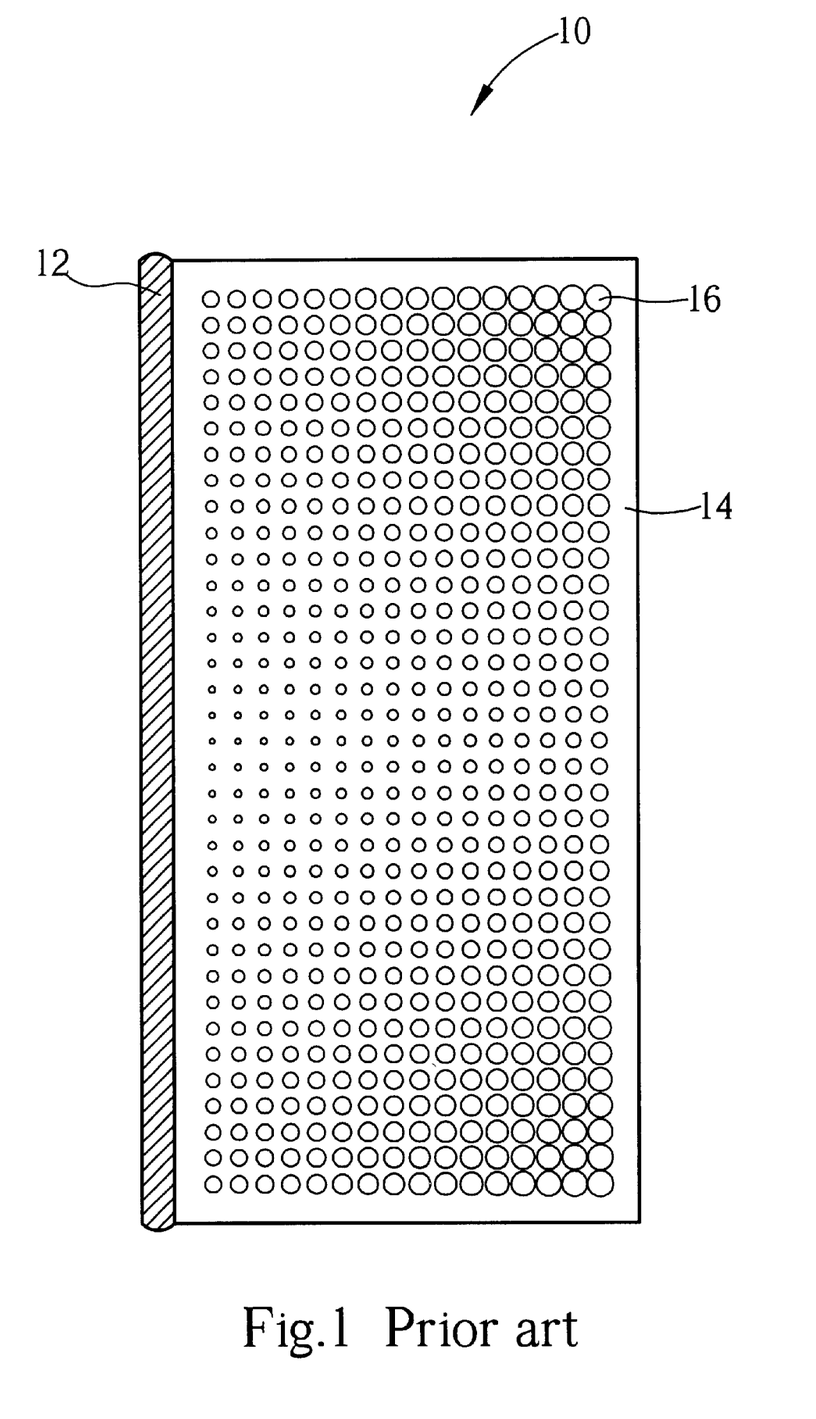
FIG. 1 depicts a top view of a back-light plate of the prior art.

Please refer to FIG. 1. FIG. 1 depicts a top view of a back-light plate 10 of the prior art. The prior art back-light plate 10 is a substantially flat and transparent plate structure, which comprises two parallel illuminating faces, and a substantially linear tube 12 is placed on one incident side of the back light plate 10. There are plural spots 16 on one illuminating face 14 of the back-light plate 10. These spots form a uniform illumination pattern. The farther the spot is away from the tube 12, the bigger the spot is and the distance between the adjacent spots is shorter. On the contrary, the nearer the spot is from the tube 12, the smaller the spot is and the distance between the adjacent spots is longer. When a visible light illuminating from the tube 12 incidents into the back-light plate 10 via the incident side, the plural spots of various sizes and of different distances make the emitted light uniformly distributed over the entire back-light plate 10. The prior art methods of performing the uniform illumination pattern on a back-light plate are mainly divided into two kinds: the method of printing and the method of injection molding. The method of printing prints the spots 16 on the hard acrylic resin plate by manpower. Not only the cost is too high, but also the quality of printing is not easily under control. For example, the ink spreads when it is too much, the performance of printing is not uniform when the ink is not enough. And the ink is easy to absorb light, so that it can't achieve the purpose of absolute reflection. As to the method of injection molding, it must fabricate a pattern mold according to the design of uniform illuminating pattern. It is not only expensive, but also leads to inconvenience when molds of different pattern design are to be fabricated. Due to the aforementioned problems, there is indeed an urgent need to develop different kinds of method to perform uniform illuminating pattern on a back-light plate, in order to reduce the cost of materials and manufacturing, and hereby enhance competence of the manufacturer.

SUMMARY OF THE INVENTION

It is therefore a primary objective of this invention to provide a method of performing a uniform illumination pattern in a back-light plate using sand-blasting. The present invention not only avoids the drawbacks in the prior arts, but also reduce the cost of materials, manufacturing, and their assembly.

According to the present invention, there is provided a method comprising steps of: (1) performing a manufacturing process to form a hole mask with a predetermined hole pattern; and (2) positioning the hole mask on one illuminating face of the back-light plate to perform a sandblasting process so as to form a plurality of recesses. After the aforementioned method is carried out, the recesses of uniform illumination pattern are formed on the back-light plate. When the visible light emitting into the back-light plate, the plurality of recesses on the illuminating face would make the emitted visible light uniformly illuminated so as to achieve its originally intended purpose.

It is an advantage of the present invention that, by means of the popular sand-blasting process, the uniform illumination pattern of the back-light plate can be performed in a simple and cost-effective method. By properly setting various parameters of the sand diameter, sand species, duration of performing the sand blasting process or force, etc, the depth of recesses are under control so as to optimize the effect of light uniformity of the uniform illumination pattern.

These and other objectives of the present invention will no doubt become obvious to those of ordinary skill in the art after reading the following detailed description of the preferred embodiment, which is illustrated in the various figures and drawings.

DETAILED DESCRIPTION OF THE PREFERRED EMBODIMENT

Figure 2:
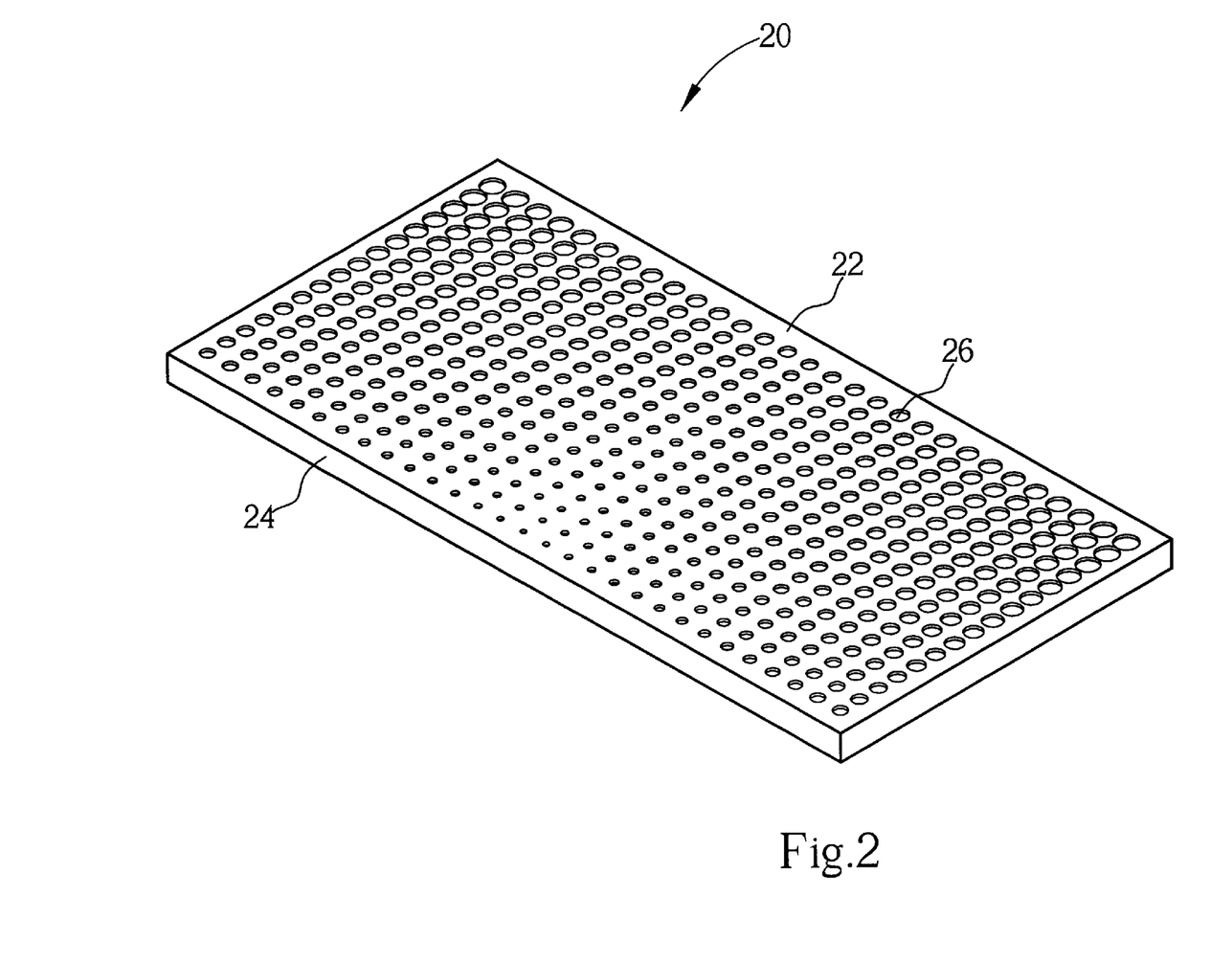
FIG. 2 is a perspective view of the back-light plate and its uniform illumination pattern thereon according to a first embodiment of the present invention.

Please refer to FIG. 2. FIG. 2 is a perspective view of the back-light plate 20 and its uniform illumination pattern thereon according to a first embodiment of the present invention. The purpose of this invention is to provide a method of sand blasting to treat the surface of the back-light plate 20, in order to form a uniform illumination pattern comprising a plurality of recesses 26. It is mainly separated into two processes. The first process is to form a hole mask be means of a metal plate. The second process is to use this hole mask and performing a sand blasting method to form the uniform illumination pattern on the back-light plate 20. The back-light plate 20 is associated with a fluorescent tube (not shown) in a scanner to provide a back light resource in order to scan transparent documents, or to be used on a liquid crystal display (LCD) to form a back light source to illuminate an LCD panel. The back-light plate 20 is a substantially flat and transparent plate structure. It comprises two parallel illuminating faces 22 and a substantially linear incident side 24 on one side of the back-light plate 20.

Figure 3:
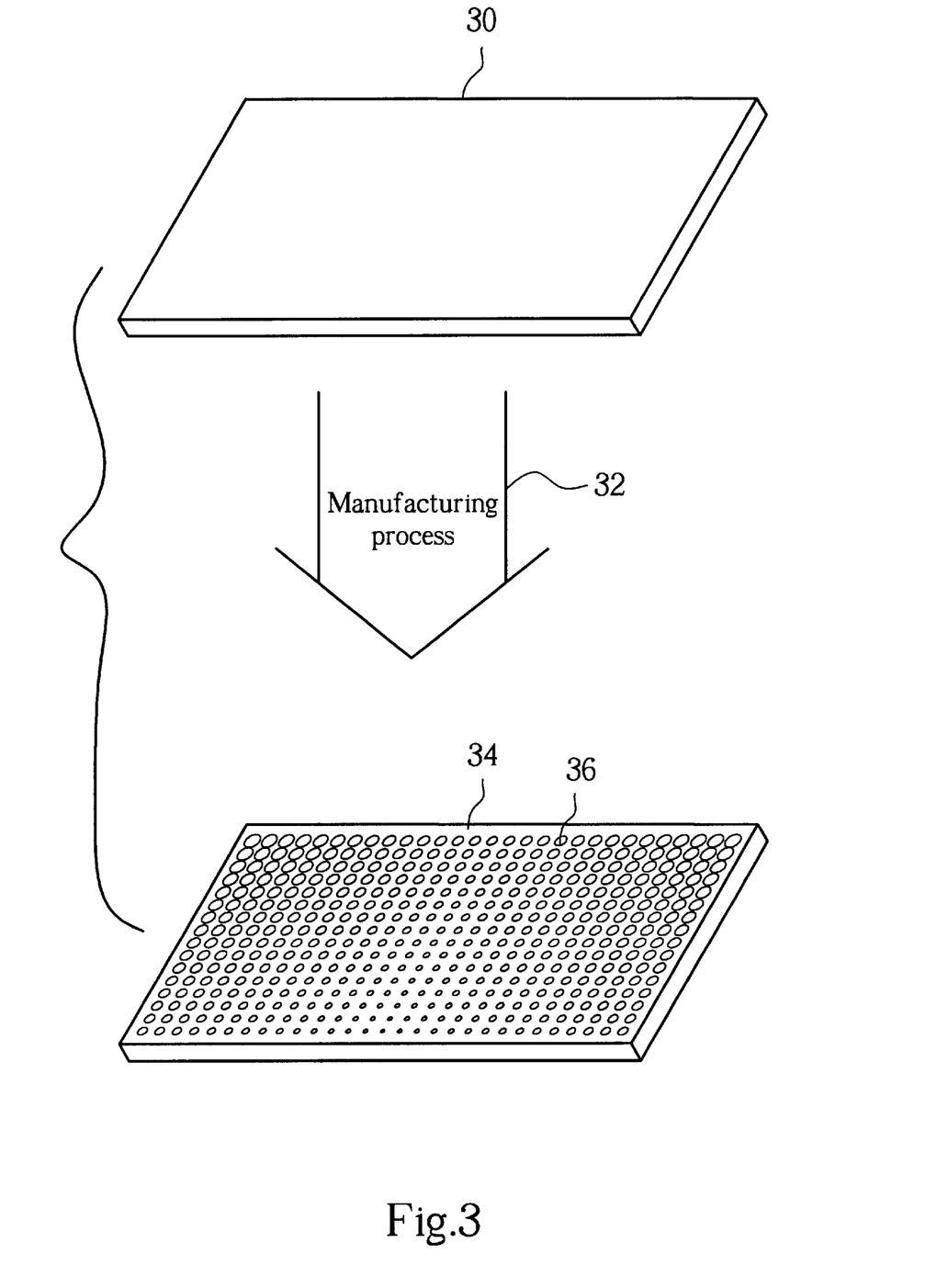
FIG. 3 is a perspective view of a hole mask according to the present invention.

Please refer to FIG. 3. FIG. 3 is a perspective view of a hole mask 34 according to the present invention. In the first process of the invention, a flat plate 30 is required. The size of the flat plate 30 must be the same or larger than the final product of the back-light plate 20. Through a manufacturing process 32, plural penetrating holes 36 of a specific-designed pattern 36 are made on the plate 30, in order to form a hole mask 34 for the second process. The material of plate 30 must be solid and able to undertake the blasting of high-speed particles. In the preferred embodiment in this invention, the plate 30 is a metal plate, and the manufacturing process 32 can be a chemical etching method to etch the penetrating holes 36, or a laser cutting method to form the penetrating holes 36. Nonetheless, the plate 30 and the forming process 32 are not restricted in the above-mentioned examples. There are also many other available materials and processes. The material of the plate 30 should be what is solid enough to undertake the blasting of high speed particles. And the forming process 32 should be chosen in accordance with the chosen material of the plate 30. The available methods are those that can fabricate penetrating holes 36 on the plate 30 to be used in the second process. As to the shape of the holes 36, it can be designed as round, square, or hexagon. The sizes of the holes 36 and their arrangement are in accordance with the design of uniform illuminating pattern to be formed on the back-light plate 20. The farther the hole 36 is away form the tube, the bigger the hole 36 is and arranged more closely. The nearer the hole 36 is from the tube, the smaller the hole 36 is and arranged more sparsely. The arrangement of the aforementioned holes 36 is not restricted in the aforementioned example. It can be adjusted and re-designed according to the practical light source and requirements of the entire system.

Figure 4:
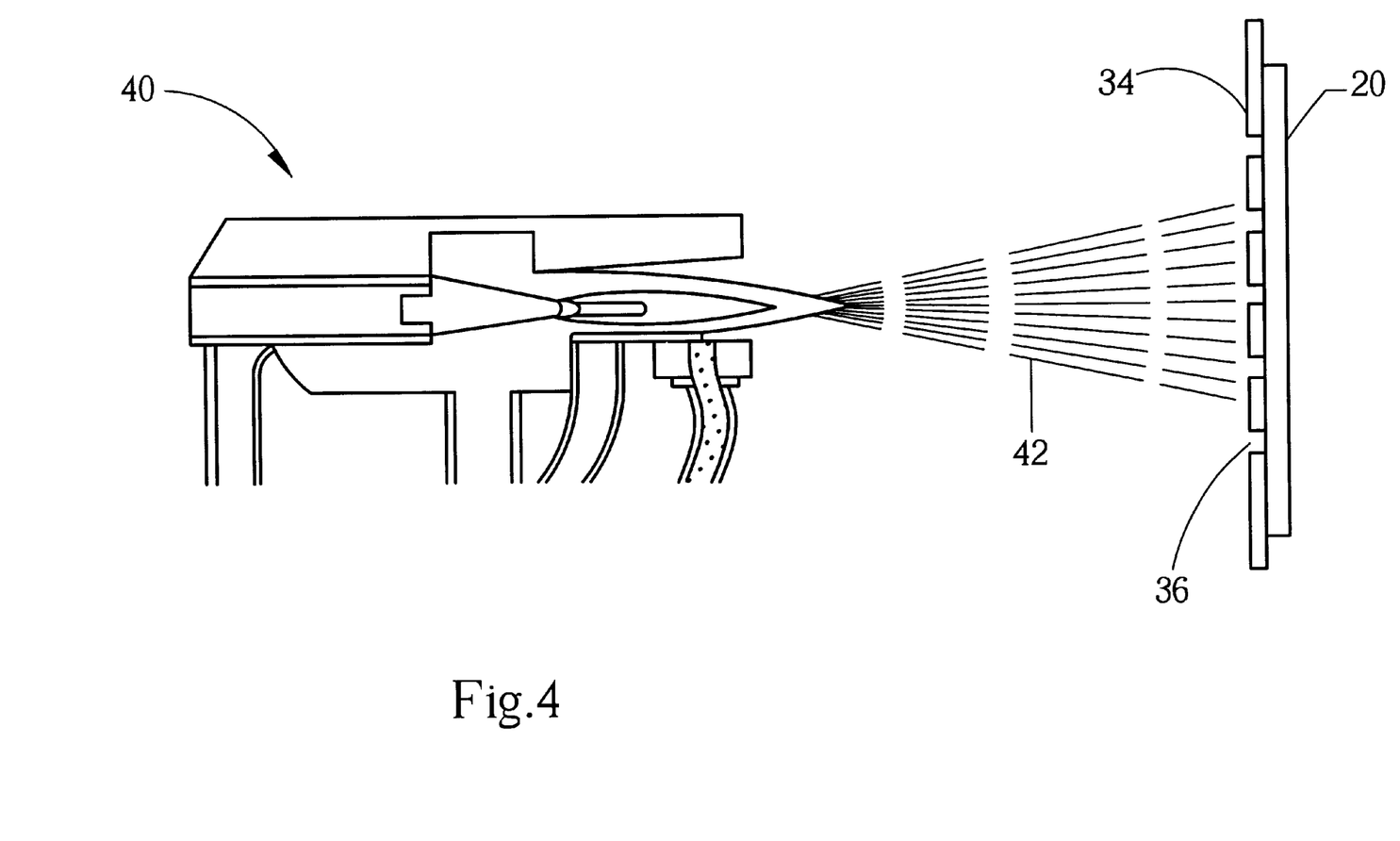
FIG. 4 is a perspective view of fabricating a back-light plate utilizing the hole mask and the sand blasting device according the present invention.

Please refer to FIG. 4. FIG. 4 is a perspective view of fabricating a back light plate 20 utilizing the hole mask 34 and the sand blasting device 40 according to the present invention. In the second process of the invention, a sand-blasting device 40 is needed and an acrylic resin plate to be processed should be prepared in advance. The sand-blasting device 40 could be a sand blasting device that is used commonly as the surface treatment of materials. In the preferred embodiment of the present invention, the sand blasting materials used in the sand blasting devise 40 is emery or glass sand. The sand blasting devise 40 blasts the chosen sand 42 with high pressure and high speed onto the hole mask 34. The blasting sand 42 will stroke at the positions on the acrylic resin plate where the penetrating holes 36 are located. And a plurality of corresponding recesses 26 are formed thereon, which are all within a predetermined depth. Where there is no hole 36, the blasting sand 42 will stroke at the metal surface of the hole mask 34, without affecting the corresponding part of the acrylic resin plate right behind. By these two processes, the processed acrylic resin plate becomes the back-light plate 20 of the present invention.

By using the hole mask 34 and the sand blasting device 40, an acrylic resin plate can be processed to be the back-light plate 20 of this invention. And we can make sure that the shape, size, and the arrangement of the uniform illuminating pattern on the illuminating faces 22 resemble the pattern of the penetrating holes 36 of the hole mask 34. That is, the farther the recess 26 is away form the tube, the bigger the recess is, and is arranged more closely to its adjacent recess. The nearer the recess 26 is from the tube, the smaller the recess is, and is arranged more sparsely to its adjacent recess. The closer the recesses 26 are from the center of the tube, the smaller the recesses 26 are, and are arranged more sparsely. All of these recesses form the uniform illumination pattern on the back-light plate 20. When the visible light emits from the incident side 24 into the back-light plate 20, the light will penetrate into the transparent plate structure of the back-light plate 20. And the uniform illumination pattern will reflect the visible light, which emits into the recesses and produces an effect of light uniformity.

It is further illustrated that the depth of the recesses 26 formed on the illuminating surface 22 of the back light plate 20 will, in fact, influence the effect of light uniformity. The effect of light uniformity changes when the depth is too much or too little. We have to design the depth of recesses 26 according the practical need, so that the effect of light uniformity reaches its optimum. After appropriate depth of the recesses 26 is designed, we can choose different kinds of sand diameter, sand species, duration of performing the sand blasting process or force to control the depth of recesses 26. The original design can therefore be achieved.

Figure 5:
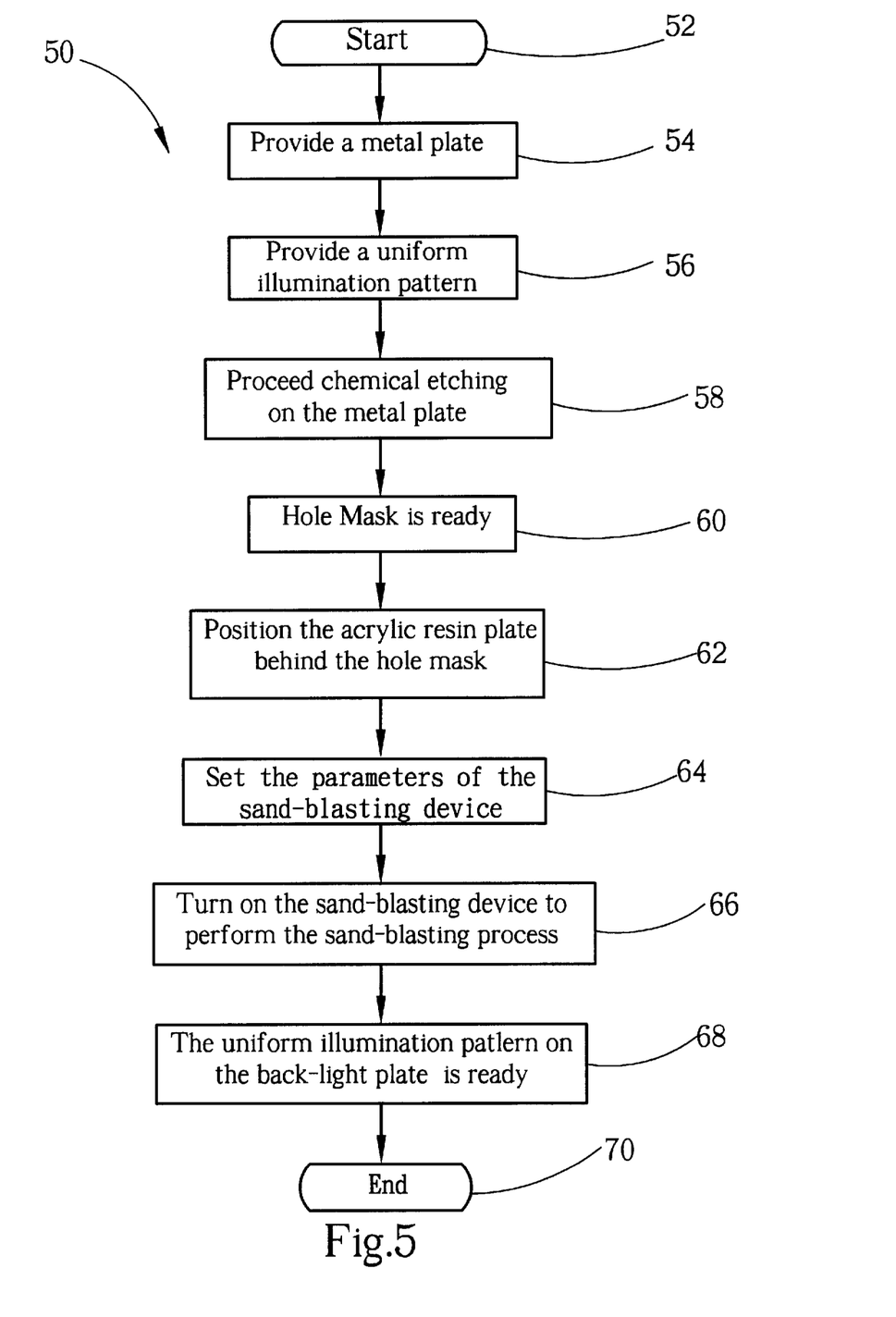
FIG. 5 is the flow chart of performing a uniform illumination pattern on a back light plate by means of sandblasting process according to the present invention.

FIG. 5, in accordance with FIG. 3 and FIG. 4, is the flow chart of performing a uniform illumination pattern on a back-light plate 20 by means of sand-blasting process according to the present invention. The flow chart 50 of performing a uniform illumination pattern on a back light plate 20 according to the preferred embodiment of the present invention comprises the following steps:

Step 52: Start;
Step 54: Provide a metal plate 30 of an adequate size;
Step 56: Provide a uniform illumination pattern that is well designed to have the effect of light uniformity;
Step 58: Proceed a chemical etching method 32 to etch the penetrating holes 36 on the metal plate 30 wherein the penetrating holes 36 are corresponding to the uniform illumination pattern;
Step 60: Finish the manufacturing of the hole mask 34;
Step 62: Position the acrylic resin plate to be processed behind the hole mask 34;
Step 64: Set the various operating parameters of the sand blasting device 40, for example: sand diameter, sand species, and duration of sand blasting and force;
Step 66: Turn on the sand blasting device 40 and perform the process of sand blasting to the hole mask 34 and the acrylic resin plate;
Step 68: Finish the sand blasting process, and the uniform illumination pattern on the back-light plate 20 is ready;
Step 70: End.

Figure 6:
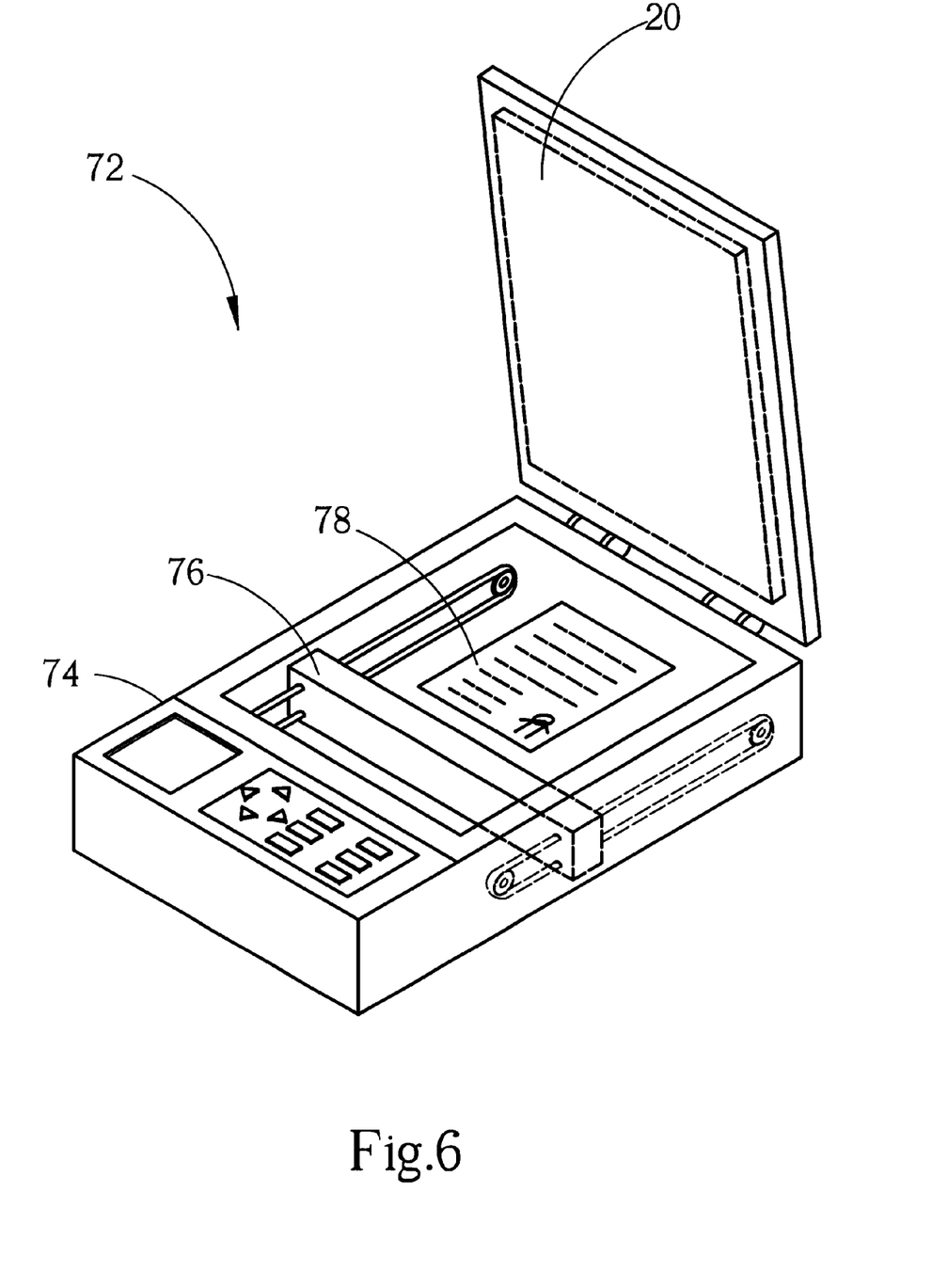
FIG. 6 is a perspective view of a scanner with a back-light plate of the present application.

Please refer to FIG. 6. FIG. 6 is a perspective view of a scanner 72 with a back-light plate 20 of the present application. The preferred embodiment of the scanner 72 is a flat-bed scanner. It comprises a casing 74, a scanning module 76 installed inside the casing 74 for scanning a transparent document 78, and a backlight plate 20 positioned in the casing for providing a uniform back-light source for scanning. The method of manufacturing the back-light plate 20 utilized in the scanner 72 has been disclosed in the aforementioned paragraph, and no redundancy is made.

Figure 7:
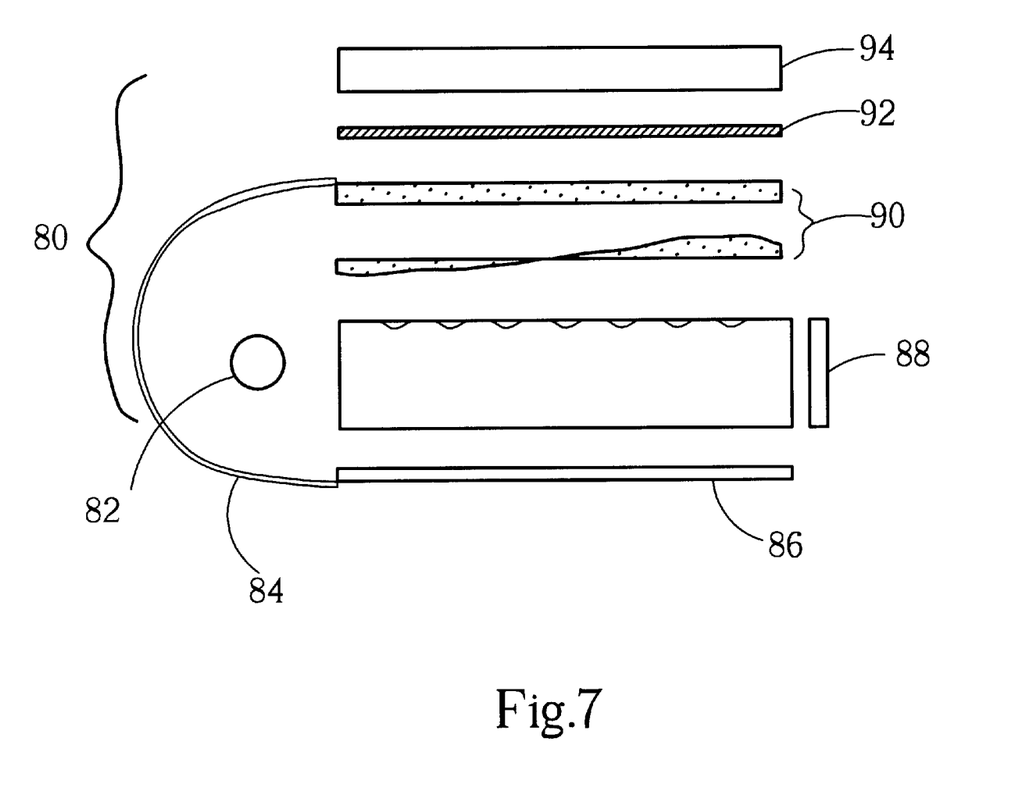
FIG. 7 is a perspective view of a liquid crystal display with a back-light plate of the present application.

Please refer to FIG. 7. FIG. 7 is a perspective view of a liquid crystal display 80 with a back-light plate 20 of the present application. The liquid crystal display 80 can be used in a popular notebook computer as a display device. The liquid crystal display 80 comprises a tube 82, reflection plates 84, 86, 88, a back-light plate 20, a group of diffusion plates 90, a polarization plate 92, and a display panel 94. Light from the tube 82 enters directly, or via reflection of the reflection plates 84, 86, 88, into the back-light plate 20. Because of a plurality of recesses on the back-light plate 20 performed by means of the sand-blasting process according to the present invention, the emitted light from the back-light plate 20 is uniformly distributed. Later on, the uniformly emitted light diffuses due to the operation of the diffusion plates 90. The incident light is then regulated by the polarization plate 92, and illuminates the display panel 94. The plurality of little crystals would modulate the incident light so that a variety of images are present on the display panel 94.

In contrast to the prior art method of forming the back-light plate 10, the invention utilizes a hole mask 34 and a sand blasting device 40 to form a plurality of recesses 26 on the illuminating face 32 of the back-light plate 20. The recesses 26 therefore serve as the uniform illumination pattern and are all within a predetermined depth. By means of the popular sand-blasting process, the present invention provides a simple, however advantageous, solution to perform the uniform illumination pattern on the back-light plate. By properly setting various parameters of the sand diameter, sand species, duration of performing the sand blasting process or force, etc, the depth of recesses 26 are under control so as to optimize the effect of light uniformity of the uniform illumination pattern.

Those skilled in the art will readily observe that numerous modifications and alterations of the device may be made while retaining the teachings of the invention. Accordingly, the above disclosure should be understood to be limited only by the bounds of the following claims.

What is claimed is:

1. A method of performing a uniform illumination pattern in a back-light plate, the back-light plate, being substantially flat and transparent, comprising two parallel illuminating faces and an incident side on one side of the back-light plate, and when a visible light emits from the incident side into the back-light plate, the visible light further emitting out from the two illuminating faces of the back-light plate, the method comprising steps of:

performing a manufacturing process to form a hole mask with a predetermined hole pattern;

positioning the hole mask on one illuminating face of the back-light plate; and performing a sand-blasting process so as to form a plurality of recesses on the back-light plate, each recess being no deeper than a predetermined depth;

wherein a distance between one recess and its adjacent recess depends on a distance between the recess and the incident side of the back-light plate, and when the distance between the recess and the incident side is longer, the distance between the recess and its adjacent recess is designed shorter, and positions of holes in the hole mask match positions of recesses of the back-light plate, the plurality of such recesses form the uniform illumination pattern of the back-light plate, and when the visible light emits into the back-light plate, the plurality of recesses on the illuminating face make the emitted visible light uniformly illuminated.

2. The method of claim 1 wherein an area of one recess depends on a distance between the recess and the incident side of the back-light plate, and when the distance between the recess and the incident side is longer, the area of the recess is designed larger.

3. The method of claim 1 wherein the hole mask is made of a metal plate and the manufacturing process is performed by using a chemical etching method to etch the metal plate so as to form the predetermined hole pattern.

4. The method of claim 1 wherein the hole mask is made of a metal plate and the manufacturing process is performed by using a laser-cutting method to cut the metal plate so as to form the predetermined hole pattern.

5. The method of claim 1 wherein the sand blasting process is performed by utilizing emery or glass sand.

6. The method of claim 1 wherein the depth of the plurality of recesses on the illuminating face is controlled by changing sand diameter, sand species, duration of performing the sand-blasting process or force exerted to sand-blast.

7. The method of claim 2 wherein areas of holes in the hole mask match areas of recesses of the back-light plate.

8. A method of performing a uniform illumination pattern in a back-light plate, the back-light plate, being substantially flat and transparent, comprising two parallel illuminating faces and an incident side on one side of the back-light plate, and when a visible light emits from the incident side into the back-light plate, the visible light further emitting out from the two illuminating faces of the back-light plate, the method comprising steps of:

performing a manufacturing process to form a hole mask with a predetermined hole pattern;

positioning the hole mask on one illuminating face of the back-light plate; and performing a sand-blasting process so as to form a plurality of recesses on the back-light plate, each recess being no deeper than a predetermined depth;

wherein an area of one recess depends on a distance between the recess and the incident side of the back-light plate, and when the distance between the recess and the incident side is longer, the area of the recess is designed larger, and areas of holes in the hole mask match areas of recesses of the back-light plate, the plurality of such recesses form the uniform illumination pattern of the back-light plate, and when the visible light emits into the back-light plate, the plurality of recesses on the illuminating face make the emitted visible light uniformly illuminated.

9. The method of claim 8 wherein a distance between one recess and its adjacent recess depends on a distance between the recess and the incident side of the back-light plate, and when the distance between the recess and the incident side is longer, the distance between the recess and its adjacent recess is designed shorter.

10. The method of claim 9 wherein positions of holes in the hole mask match positions of recesses of the back-light plate.

\* \* \* \* \*